United States Patent

Smith et al.

[11] Patent Number: 5,246,314
[45] Date of Patent: * Sep. 21, 1993

[54] BOTTLE AIR CONVEYOR WITH ADJUSTABLE GUIDES

[75] Inventors: Paul W. Smith, Forest; Brian K. Hilbish, Bedford, both of Va.

[73] Assignee: Simplimatic Engineering Company, Lynchburg, Va.

[*] Notice: The portion of the term of this patent subsequent to Nov. 10, 2009 has been disclaimed.

[21] Appl. No.: 941,534

[22] Filed: Sep. 8, 1992

Related U.S. Application Data

[63] Continuation-in-part of Ser. No. 741,108, Aug. 6, 1991, Pat. No. 5,161,919.

[51] Int. Cl.$^5$ .............................................. B65G 51/02
[52] U.S. Cl. ......................................... 406/86; 406/88
[58] Field of Search .................. 406/86, 88; 198/836.3

[56] References Cited

U.S. PATENT DOCUMENTS

| | | | |
|---|---|---|---|
| 2,156,020 | 4/1939 | Lathrop | 198/836.3 |
| 2,229,605 | 1/1941 | Snyder et al. | 198/836.3 |
| 2,422,726 | 6/1947 | Goldacker | 198/836.3 |
| 3,527,336 | 9/1970 | Johnston | 198/836.3 |
| 3,850,478 | 11/1974 | Hurd . | |
| 3,953,076 | 4/1976 | Hurd . | |
| 4,284,370 | 8/1981 | Danler et al. . | |
| 4,724,035 | 2/1988 | Mann et al. . | |
| 4,822,214 | 4/1989 | Aidlin et al. . | |
| 4,938,636 | 7/1990 | Aidlin et al. . | |
| 5,028,174 | 7/1991 | Karass . | |
| 5,099,979 | 3/1992 | Kehrel | 198/836.3 X |
| 5,100,265 | 3/1992 | Mirkin . | |
| 5,161,919 | 11/1992 | Smith et al. | 406/86 |

FOREIGN PATENT DOCUMENTS

| | | | |
|---|---|---|---|
| 344417 | 12/1989 | European Pat. Off. | 406/86 |
| 2580609 | 4/1986 | France . | |
| WO90/10587 | 9/1990 | PCT Int'l Appl. . | |
| 592908 | 10/1947 | United Kingdom | 198/836.3 |

Primary Examiner—David M. Mitchell
Assistant Examiner—Gary C. Hoge
Attorney, Agent, or Firm—St. Onge, Steward, Johnston & Reens

[57] ABSTRACT

An air conveyor for articles having outwardly extending flanges. The air conveyor includes a plenum chamber having a base portion, walls extending from said base portion to form a conveying channel, flange guides mounted to said walls for supporting articles beneath their flanges, and apertures in the walls beneath the flange guides for directing air from the plenum chamber toward the articles beneath the flanges. A reduced friction flange guide which may be used with the air conveyor includes flange guides angled with respect to the flanges. A relatively quickly and easily adjustable article guide which may be used with the conveyor includes a pair of article guides movable between a first position for guiding articles having a first size and shape, and a second position.

20 Claims, 10 Drawing Sheets

BOTTLE AIR CONVEYOR WITH ADJUSTABLE GUIDES

This is a continuation-in-part of copending U.S. patent application Ser. No. 07/741,108 filed Aug. 6, 1991, now U.S. Pat. No. 5,161,919.

FIELD OF THE INVENTION

This invention relates to a conveyor for articles such as bottles having an outwardly extending flange or neck ring. More specifically, this invention relates to a bottle coveyor which directs air onto the bottles beneath their neck rings, and to a reduced friction neck guide and an adjustable bottle guide which may be used in a bottle conveyor.

BACKGROUND ART

Several air systems having various features are generally known for conveying bottles. U.S. Pat. No. 4,283,370 to Danler comprises a plurality of air slots or jets, in vertically oriented coveying channel side walls, for issuing air impinging on neck portions of the bottles. U.S. Pat. No. 4,822,214 to Aidlin comprises a plurality of air directing louvers in the top and side walls of an inverted, U-shaped interior channel which receives the neck portion of a container. The louvers convey the container in the direction of the air flow and fill the container with air.

Designs such as these which provide air jets disposed above the neck tracks, or otherwise convey bottles by directing air toward the bottles at a location above their neck rings, are disadvantageous since contaminants in air from the plenum may be introduced into the bottles. This disadvantage may be exacerbated in a design requiring that a relatively large bottle be conveyed by directing air substantially only at a relatively small neck portion of the bottle since conveying such a bottle may necessitate relatively high air pressures. A further disadvantage is friction which may develop between the neck tracks of a conveyor and the neck rings of bottles, requiring increased air pressure to convey bottles and reducing system efficiency. Increases in the air pressure required to convey bottles may lead to increases in the contamination of bottles by plenum air. Another disadvantage is the time and effort required to change bottle air conveyor lines over to handle differently sized or shaped bottles.

SUMMARY OF THE INVENTION

Accordingly, it is an object of this invention to provide an air conveyor for articles such as bottles which is relatively efficient in operation.

Another object of the invention is to provide an air conveyor which aids in reducing bottle contamination.

A further object of the invention is to provide an air conveyor of the above character which does not direct air substantially toward a neck portion of bottles.

Yet another object of the invention is to provide an air conveyor of the above character which directs air beneath the neck rings of bottles.

A still further object of the invention is to provide an air conveyor of the above character which directs air substantially toward a shoulder portion of bottles.

Still another object of the invention is to provide reduced friction neck guides which may be used in an air conveyor of the above character.

A yet still further object of the invention is to provide an air conveyor of the above character having reduced friction neck flange guides.

Yet still another object of the invention is to provide means for relatively quickly and easily and preferably substantially automatically adjusting the article guides to accommodate variously sized and shaped articles.

Other objects of the invention will be obvious and may in part appear hereinafter.

These and other objects are achieved by provision of an air conveyor for bottles having neck rings comprising a plenum chamber having a base portion, walls extending from said base portion to form a conveying channel, neck guides mounted to said walls for supporting bottles beneath their neck rings, and a plurality of apertures in the walls beneath the neck guides for directing air from the plenum chamber onto the bottles beneath their neck rings. The conveying channel may be inverted and substantially V-shaped or the walls may slope away from the bottles beneath the neck guides. The plurality of apertures may be arrayed in the walls in a plurality of rows of at least one aperture.

A reduced friction neck guide which may be used with the air conveyor is also provided and comprises neck guides mounted at an angle to the base portion of the plenum chamber such that neck rings of bottles rest on the neck guides substantially in a point contact.

A relatively quickly and easily adjustable article guide which may be used with the air conveyor is also provided and comprises a pair of bottle guides movable between a first position for guiding bottles of a first size and shape along the air conveyor, and a second position; and means for moving the pair of bottle guides between the first and second positions.

The invention and its particular features will become more apparent from the following detailed description considered with reference to the accompanying drawings.

DETAILED DESCRIPTION OF THE INVENTION

Figure 1:
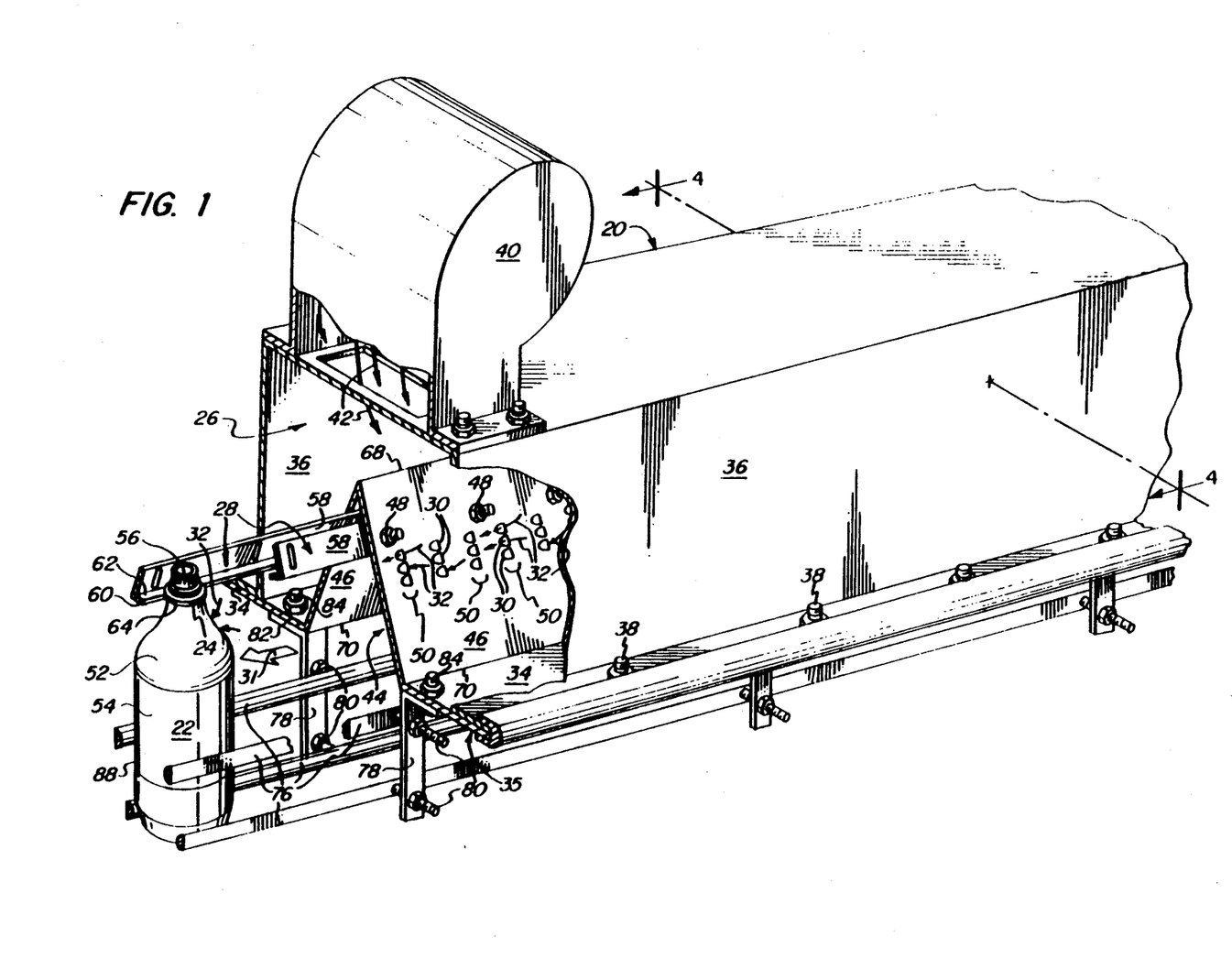
FIG. 1 is a front isometric view of one embodiment of an air conveyor for bottles having neck rings in accordance with the invention.
Figure 4:
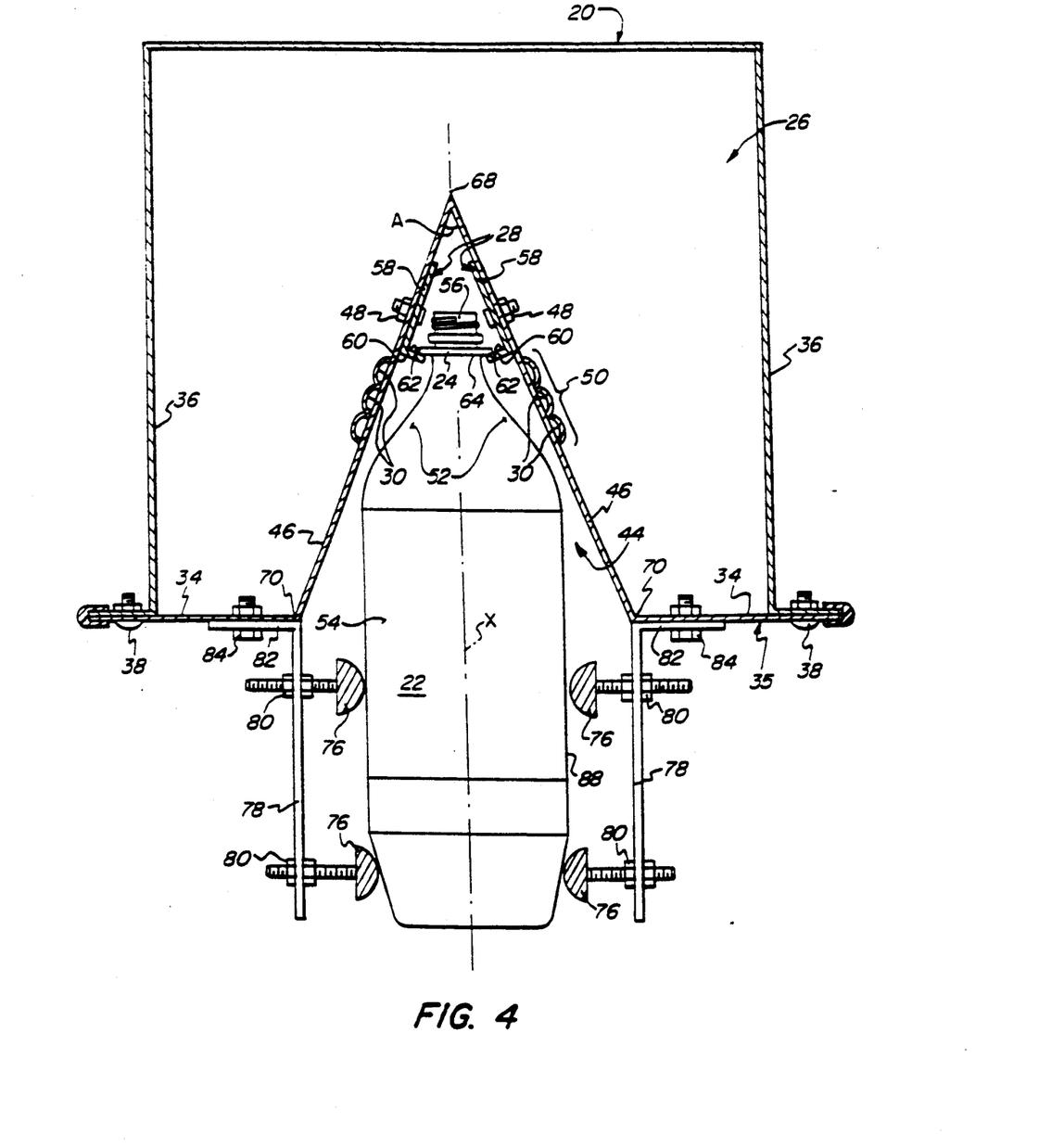
FIG. 4 is an end cross-sectional view of the air conveyor of FIG. 1 taken along plane 4—4 in FIG. 1.
Figures 6, 7, 8, 9:
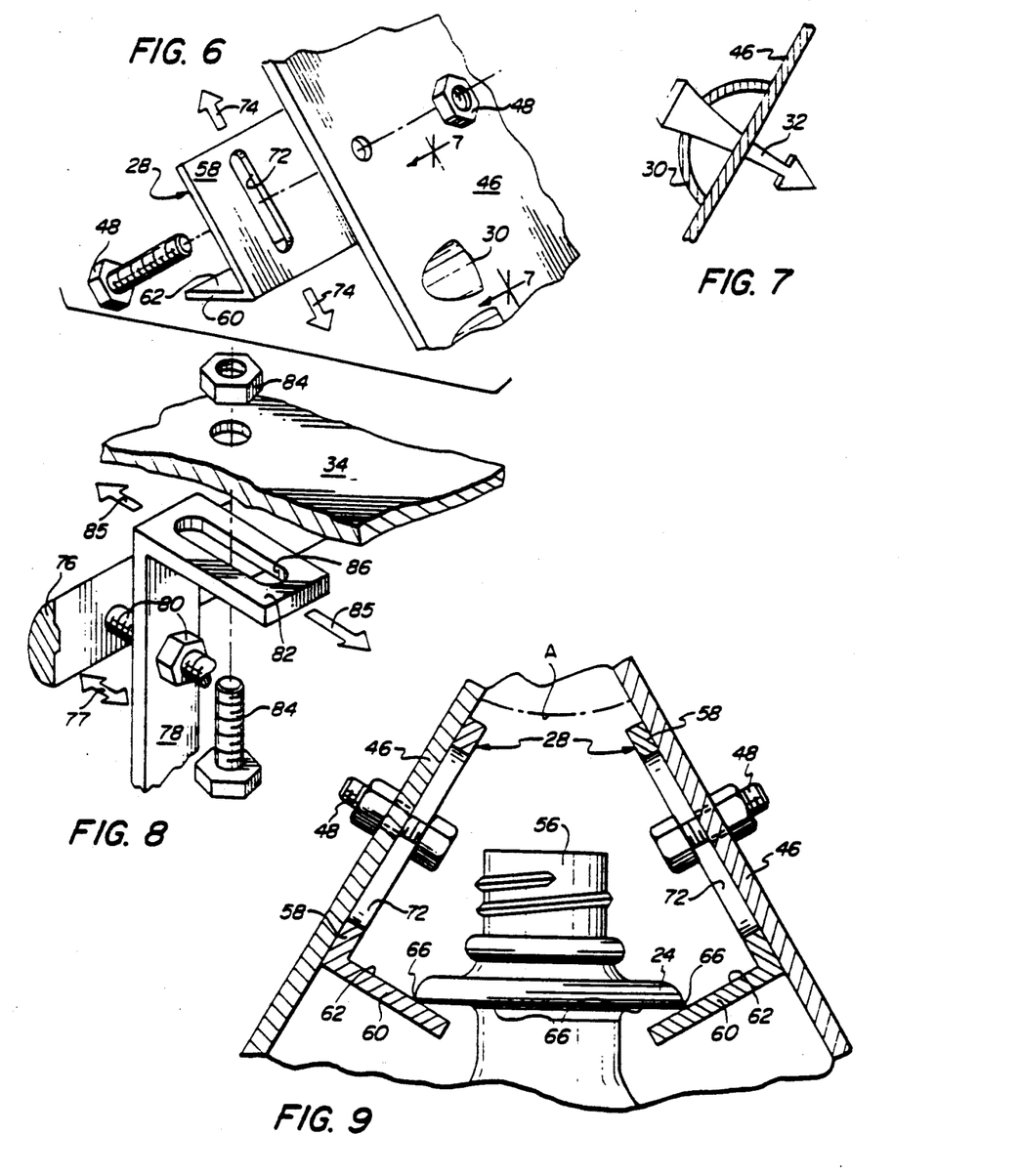
FIG. 6 is an enlarged exploded partial front isometric view of the air conveyor of FIG. 1 revealing the adjustability of the neck guides.
FIG. 7 is an enlarged partial cross-sectional view of the channel wall of the air conveyor of FIG. 1 taken along plane 7—7 in FIG. 6.
FIG. 8 is an enlarged exploded partial front isometric view of the air conveyor of FIG. 1 revealing the adjustability of the bottle guides.
FIG. 9 is an enlarged partial end cross-sectional view of the air conveyor of FIG. 1 depicting point contact between the neck guides and neck rings of bottles.

Referring to FIGS. 1 and 4, an air conveyor 20 in accordance with the invention is generally shown in front isometric and end cross-sectional views. Air conveyor 20 is designed for conveying articles, such as bottles 22, having outwardly extending flanges, such as neck rings 24. Air conveyor 20 generally comprises a plenum chamber 26, neck guides or tracks 28 for supporting bottles 22 beneath their neck rings 24, and a plurality of apertures 30 for conveying bottles 22 in the direction of arrow 31. Air is directed from plenum chamber 26 through apertures 30 toward bottles 22 as indicated by arrows 32 (FIGS. 1 and 7 only).

Plenum chamber 26 comprises a base portion 34 at its base 35, and an upper wall portion 36. Base portion 34 and upper wall portion 36 at least partially enclose plenum chamber 26 and are fastened together by means such as nut and bolt combinations 38. One or more blowers 40 or the like pressurize plenum chamber 26 with air as indicated by arrows 42 (FIG. 1 only).

Bottles 22 are conveyed along a channel 44 formed by and between opposing walls 46 extending, preferably upwardly, from base 35 of plenum chamber 26. By "upwardly" is meant substantially away from base 35. Neck guides 28 for supporting bottles 22 are mounted to opposing walls 46 with nut and bolt combinations 48 or the like. Preferably, neck guides 28 are mounted within channel 44.

Air directing apertures 30 are preferably located in walls 46 at a position beneath neck guides 28. By "beneath neck guides" is meant on a side of neck guides 28 beneath neck rings 24 on bottles 22. Apertures 30 are preferably arrayed in walls 46 in a plurality of rows 50 of at least one, more preferably at least two, and most preferably three apertures each. Apertures 30 are preferably disposed in walls 46 so as to substantially direct air toward bottles 22 at a position beneath their neck rings 24, and most preferably toward their shoulder portions 52.

Shoulder portions 52 of bottles 22 extend between neck rings 24 and body portions 54 of bottles 22. Body portion 54 is generally that portion of bottles 22 including the greatest girth. Shoulder portion 52 generally tapers from body portion 54 to neck ring 24. A neck portion 56 or "finish" of bottles 22 is that portion of bottles 22 extending above neck rings 24. Neck portion 56 is generally the outer portion of bottles 22 most important to keep sanitary. Neck portion 56 may include threads of the like to aid in filling the bottle or to receive a cap or other seal (not shown in any Figure).

Figure 2:
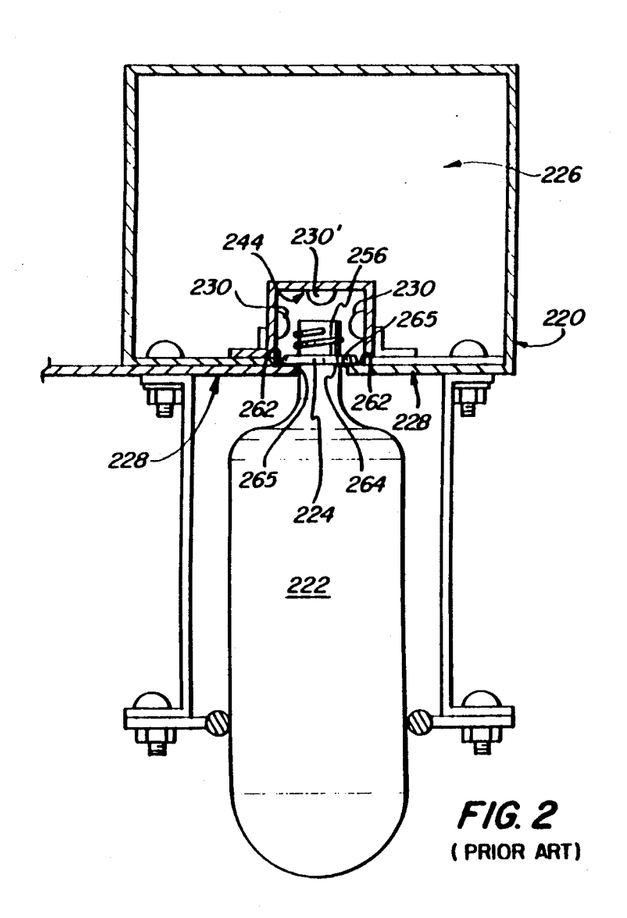
FIGS. 2 and 3 are end cross-sectional views of conveyor systems for bottles having neck rings which are prior art to the air conveyor of FIG. 1.
Figure 3:
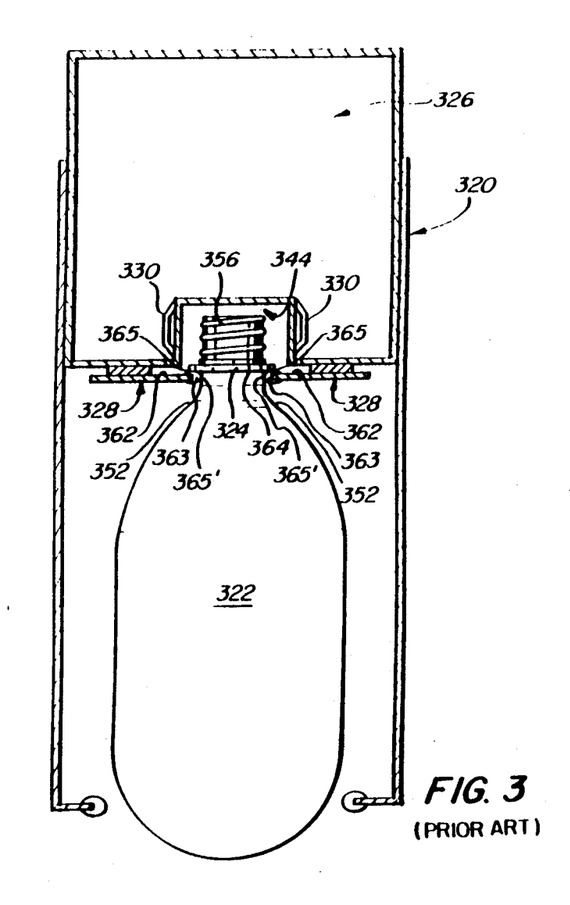

Referring now to FIGS. 2 and 3, apertures 230, 330 in respective prior art bottle air conveyors 220, 320 are only located above neck guides 228, 328. Further, prior art apertures 230, 330 direct air from plenum chambers 226, 326 substantially only at neck portions 256, 356 or above neck rings 224, 324 of bottles 222, 322. These prior art conveyors disadvantageously convey bottles by directing air, which may include contaminants, at the portions of bottles which are most important to keep sanitary. Further, aperture 230' directs air which may include contaminants into bottles 222.

Returning now to FIGS. 1 and 4, apertures 30 of conveyor 20 do not direct air at neck portion 56 but substantially only beneath neck rings 24 of bottles 22. By directing air substantially at shoulder portions 52 of bottles 22, apertures 30 also effectively convey bottles 22 without unnecessarily rocking them back and forth along the direction of arrow 31 (FIG. 1 only).

Referring now to FIG. 4, walls 46 preferably converge at an angle A of between about 30 and 90 degrees, and most preferably between about 45 and 60 degrees, as they extend toward neck guides 28. That is, walls 46 preferably slope away from an axis X of bottles 22 as they extend downwardly from neck guides 28. By "downwardly" is meant substantially toward base 35. Walls 46 preferably also converge, or otherwise lie, in substantial proximity with shoulder portions 52 of bottles 22. In this regard, apertures 30 are also preferably disposed in substantial proximity with shoulder portions 52 of the bottles in order to improve conveying efficiency.

Referring to FIGS. 1, 4 and 9, neck guides 28 comprise a mounting arm 58 and a support arm 60. Support arm 60 includes a support surface 62 for contacting neck rings 24 to support bottles 22. Support surfaces 62 extend inwardly from walls 46, and are preferably also angled downwardly to receive a lower surface 64 of neck rings 24 substantially in a point contact at 66.

Referring again to FIGS. 3 and 2, prior art neck guides 328, 228 are not located in channel 344, 244 of respective prior art bottle air conveyors 320, 220. Neck guides 328 include support surfaces 362 having wear-strips 363 or the like attached thereto which receive a lower surface 364 of neck rings 324 in a relatively high friction line or surface contact at 365. Wearstrips 363 may also receive shoulder portions 352 of bottles 322 in an additional point contact at 365'. Neck guides 228 include support surfaces 262 which receive lower surfaces 264 of neck rings 224 in a relatively higher friction surface contact at 265.

Returning to FIGS. 1, 4 and 9, by downwardly angling support surfaces 64 of neck guides 28, frictional contact between lower surface 66 of neck rings 24 and support surfaces 62 of neck guides 28 is reduced, and bottles 22 may thus be conveyed more efficiently.

Preferably, walls 46 continue to converge or slope to a point beyond neck guides 28, and most preferably converge toward an apex 68. In this regard, channel 44 is an inverted, substantially "V"-shaped channel. In embodiments of conveyor 20 where walls 46 converge beyond neck guides 28, support surfaces 62 preferably extend substantially perpendicularly from walls 46. Angle A preferably ranges between about 30 and 90 degrees depending upon the size of bottles 22 to be conveyed.

Walls 46 and base portion 34 of plenum chamber 26 may, but need not be, conveniently provided as a unitary, one-piece construction. In this regard, base portion 34 and walls 46 may, but need not be, formed from a single sheet of material by bending it three or more times. For example, bends at 70 may delimit base portion 34 from walls 46, and a third bend may form apex 68 or the like. It is understood that, in other embodiments, two or more bends may replace apex 68. It is also understood that walls 46 and base portion 34 of plenum 26 may also be provided as two or more pieces which may be connected together by welding or the like, for example at apex 68.

Figure 5:
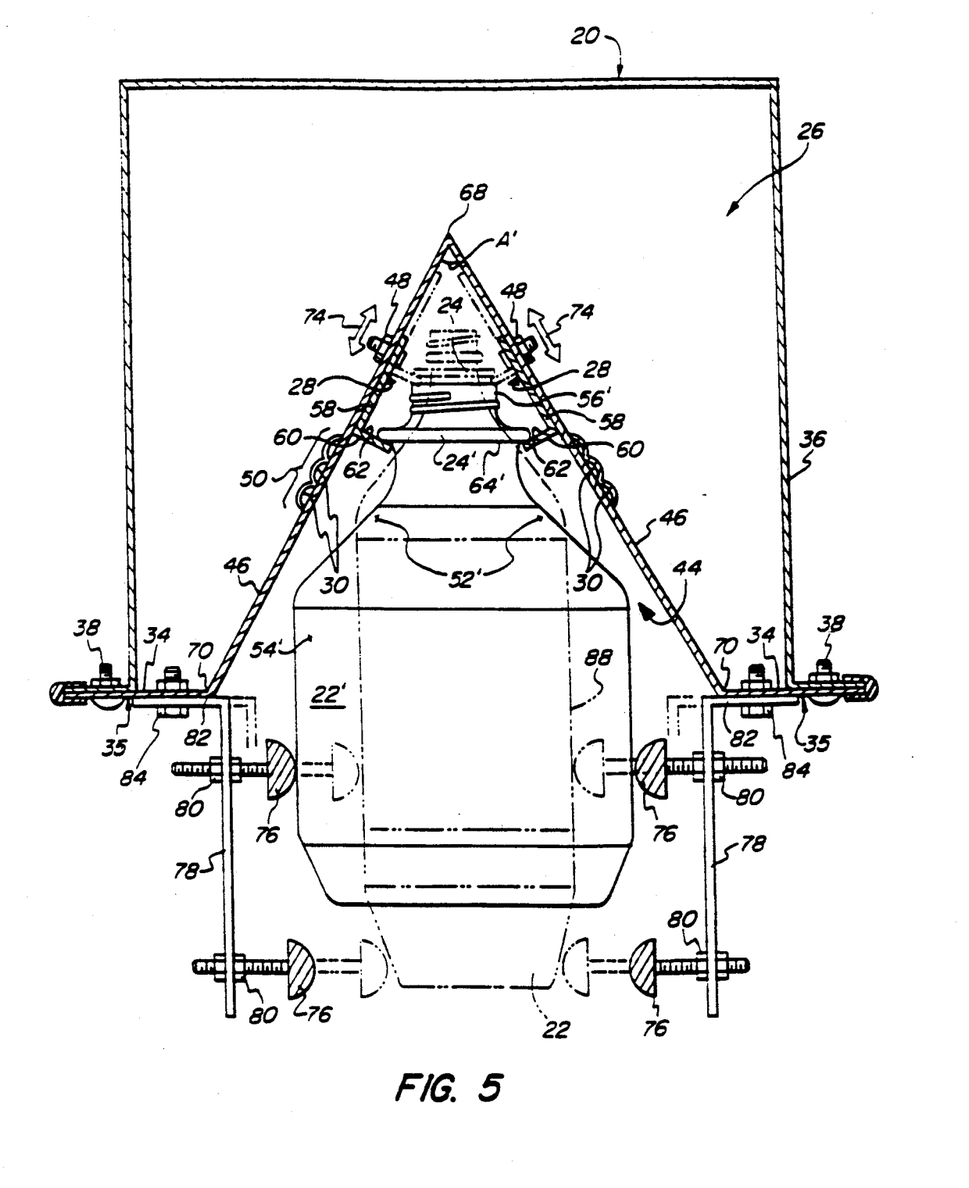
FIG. 5 is an end cross-sectional view of an air conveyor in accordance with the embodiment of FIG. 1 but having a wider conveying channel.

Referring now to FIGS. 4, 5 and 6, several means for accommodating different size bottles 22, 22' with conveyor 20 are illustrated. First, mounting arms 58 of neck guides 28 include mounting slots 72 (FIG. 6 only) permitting neck guides 28 to be adjustably mounted to walls 46 for movement in the direction of arrows 74. Adjustment of neck guides 28 along converging sections of opposing walls 46 moves support surfaces 62 closer together and farther apart enabling bottles having various size neck rings 24, 24' to be accommodated by conveyor 20. For example, a single set of neck guides 28 is shown spaced relatively far apart to receive neck ring 24' and support bottle 22', and is also shown in dashed lines spaced less far apart to receive neck ring 24 and support bottle 22.

Second, and generally only upon installation, angle A may be provided with virtually any acute magnitude necessary to accommodate a bottle or series of bottles to be conveyed. For purposes of illustration only, angle A' in FIG. 5 is shown slightly larger than angle A in FIG. 4. It is understood, that because of the adjustability of neck guides 28, bottles 22 may be accommodated by walls 46 converging at either angle A or A'.

Referring now to FIGS. 1, 4, 5 and 8, conveyor 20 also includes bottle or article guides 76 mounted for adjustment in the direction of arrow 77 (FIG. 8 only) to brackets 78 by nut and bolt combination 80. Bracket 78 is adjustably fastened by slotted arm 82 to base portion 34 of plenum chamber 26 with a nut and bolt combination 84. In this regard, bracket 78 may be adjusted in the direction of arrows 85 by sliding bolt 84 along slot 86 (see FIG. 8). By adjusting both bracket 78 along slot 86 and bottle guides 76 from bracket 78, bottle guides 76 can be arranged to substantially match varying silhouettes 88, 88' of bottles 22, 22' and the like, and aid in preventing the bottles from swinging side to side during conveying (see FIG. 5).

Figure 13:
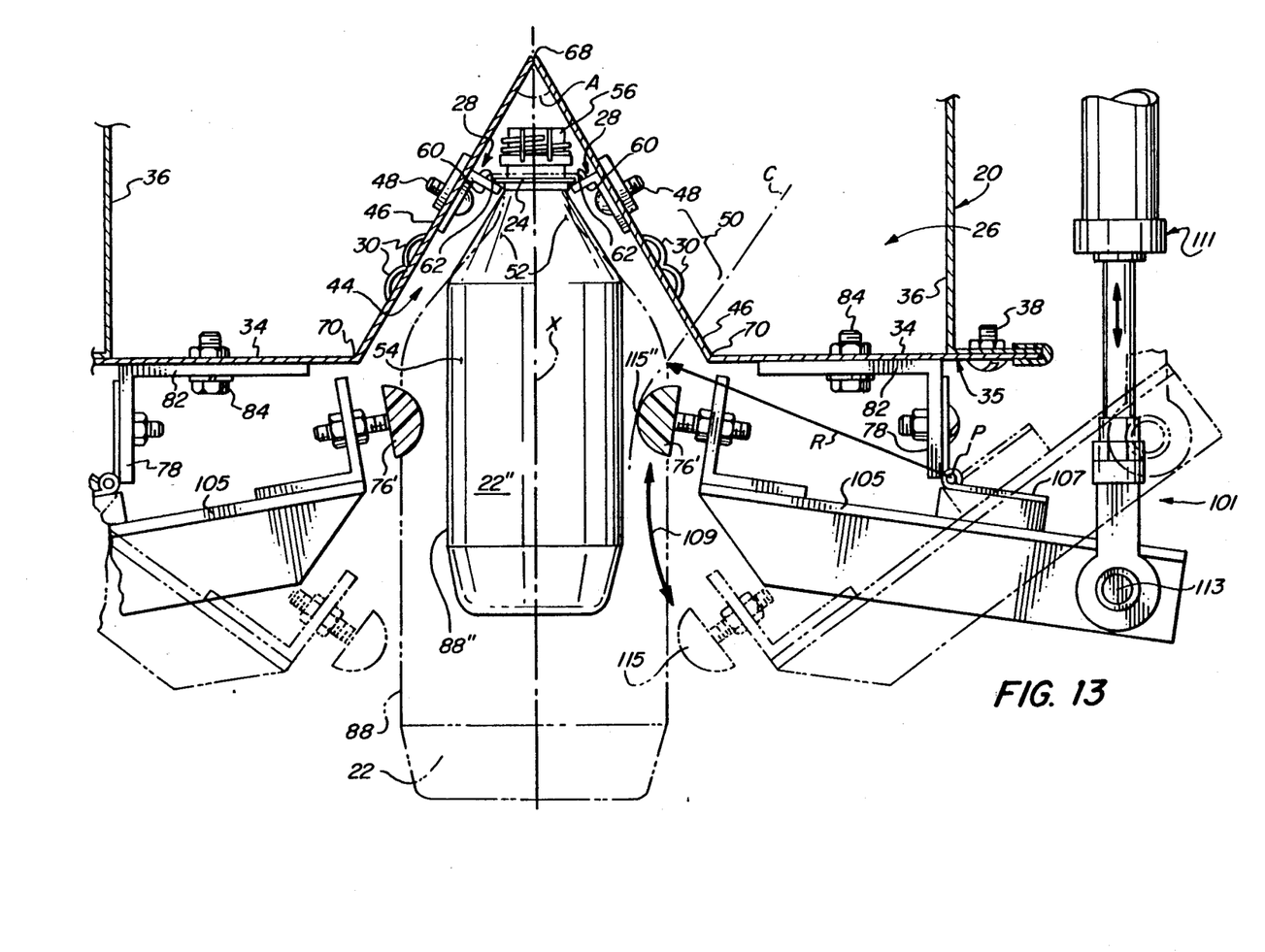
FIG. 13 is an enlarged, partial, end cross-sectional view of the air conveyor of FIG. 1 including means for automatically adjusting the article guides along substantially straight conveyor portions.
Figure 14:
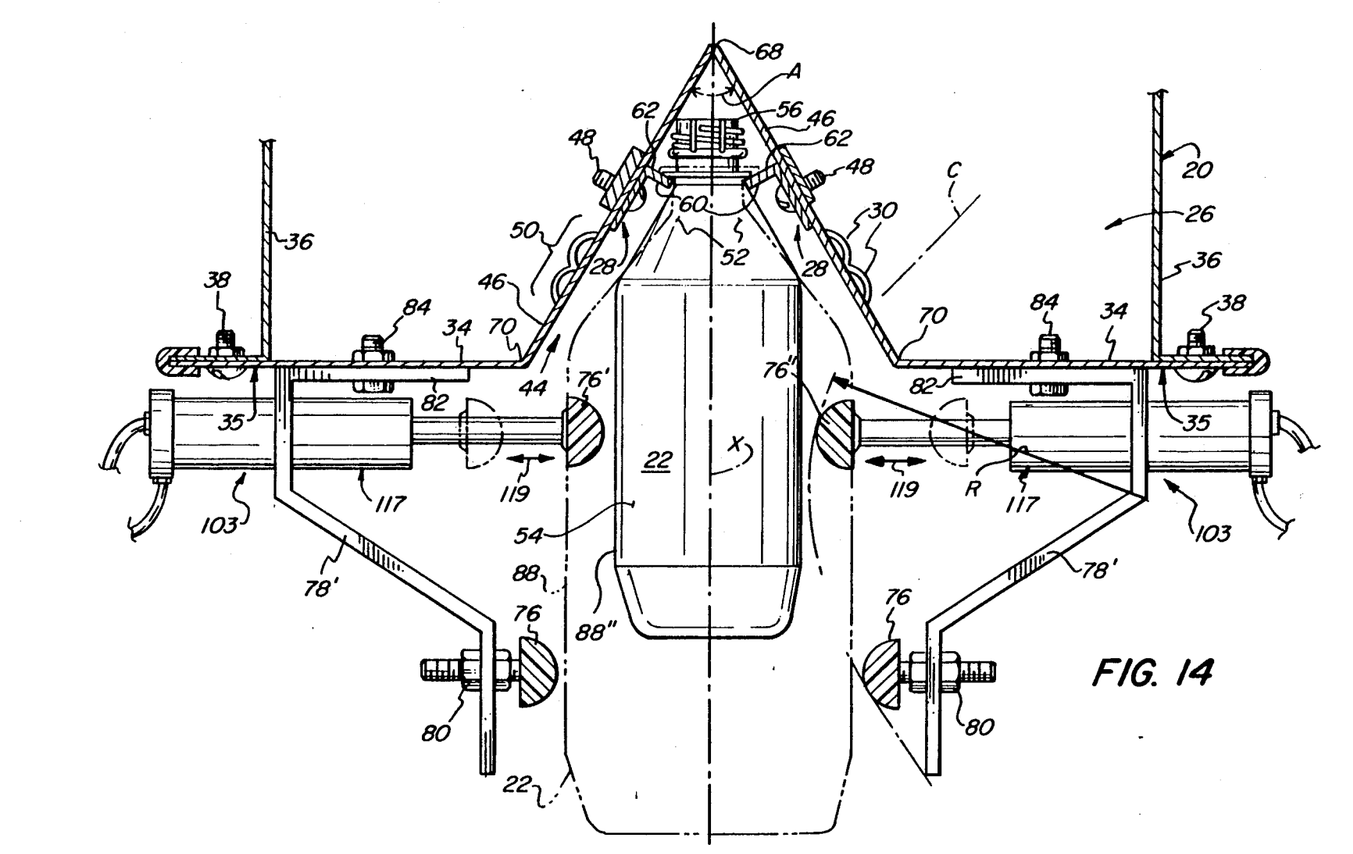
FIG. 14 is an enlarged, partial, end cross-sectional view of the air conveyor of FIG. 1 including means for automatically adjusting the article guides along substantially curving conveyor portions.

Referring to FIGS. 13 and 14, conveyor 20 may also include means 101 (FIG. 13) for relatively quickly and easily adjusting bottle guides 76' to accommodate various bottle sizes and shapes 88, 88" along substantially straight portions of conveyor 20, and means 103 (FIG. 14) for relatively quickly and easily adjusting bottle guides 76' to accommodate various bottle sizes and shapes 88, 88" along substantially straight or curving portions of conveyor 20. Bottle guides 76' are adjustably mounted to brackets 78 for adjustment toward and away from bottle axis X. Brackets 78 are adjustably fastened by slotted arm 82 to base portion 34 of plenum chamber 26 with a nut and bolt combination 84. In this regard, brackets 78 may be adjusted in the direction of arrows 85 by sliding bolt 84 along slot 86 (see FIG. 8).

Referring specifically to FIG. 13, bottle guides 76' are connected to arm members 105 which are mounted by hinges 107 or the like to brackets 78 for rotation about a pivot point P. Rotation of arms 105 about pivot P moves bottle guide 76' along an arc C having a radius R in the direction of arrow 109. Moving means such as rod and cylinder 111 (only one shown) is mounted at 113 to arms 105 to provide rotational movement thereto. It is understood that other mechanical, electrical, pneumatic, hydraulic or like actuators may also be used. As bottle guide 76 is moved along arc C it is able to accommodate bottles 22, 22" having varying girths and silhouettes 88, 88". Generally, as bottle guide 76' traverses arc C in a direction toward bottle neck rings 24, the bottle guides move closer to bottle axis X. Guides 76' are preferably provided as semicircular shaped so that various surface portions 115, 115" are used to guide corresponding bottles 22, 22", reducing wear and prolonging the usable life of the guides.

It is understood that the length of brackets 78 and arms 105 may be adjusted to accommodate variously sized and shaped bottles. For example, as illustrated, relatively short brackets 78 are best suited for conveying combinations of shorter, narrower bottles (22"), with longer, wider bottles (22) whereas longer brackets 78 would be better suited to combinations of shorter, wider bottles with longer, narrower bottles.

Bottle guide adjusting means 101 is best suited to substantially straight conveyor line portions in which the guide rail length is the same regardless of bottle size.

Referring specifically to FIG. 14, one or more pair of bottle guides 76 are mounted to brackets 78' by a nut and bolt combination 80, and one or more pair of bottle guides 76' are mounted to adjusting means 103 such as a rod and cylinder 117. It is understood that other mechanical, electrical, pneumatic, hydraulic or like actuators may also be used. Rod and cylinder 117 may conveniently be connected to bracket 78' for linearly moving bottle guides 76' generally toward and away from (though not necessarily perpendicularly so) bottle axis X in the direction of arrow 119. It is understood that the arrangement of bottle guides 76, 76' along bracket 78' may be varied as necessary to accommodate bottles 22, 22" and others. In this regard, the illustrated length and articulation of bracket 78' may be adjusted or eliminated as desired or as required to accommodate various bottles. Generally, bottle guides 76 are set to accommodate the bottle 22 having the widest silhouette, while bottle guides 76' are extendable to guide narrower bottles 22" and are retractable so as not to interfere with conveyance of wider bottles 22.

The FIG. 14 combination of guides 76, 76' may be used on straight or curving conveyor lines but are most economically only used on curving portions since they require an additional pair of bottle guides. Preferably adjusting means 103 is utilized on curving portions of conveyor 20 with guides 76, 76' having slightly different lengths due to the different turn radiuses for differently sized bottles, and adjusting means 101 (FIG. 13) is utilized on substantially straight portions of conveyor 20 since it requires slightly less guide material to construct. In this regard, bottle guides 76 of FIG. 14 are preferably mounted in a position along arc C corresponding to the lower position of bottle guide 76' of FIG. 13 to guide bottles 22, and bottle guides 76' of FIG. 14 are preferably extendable to a position on arc C corresponding to the upper position of bottle guide 76' of FIG. 13 to guide bottles 22". It is understood that adjusting means 101, 103 may be manually operated between runs of differently sized or shaped bottles, but that adjusting means 101, 103 are preferably automatically operated by a controller (not shown in any Figure).

Figure 10:
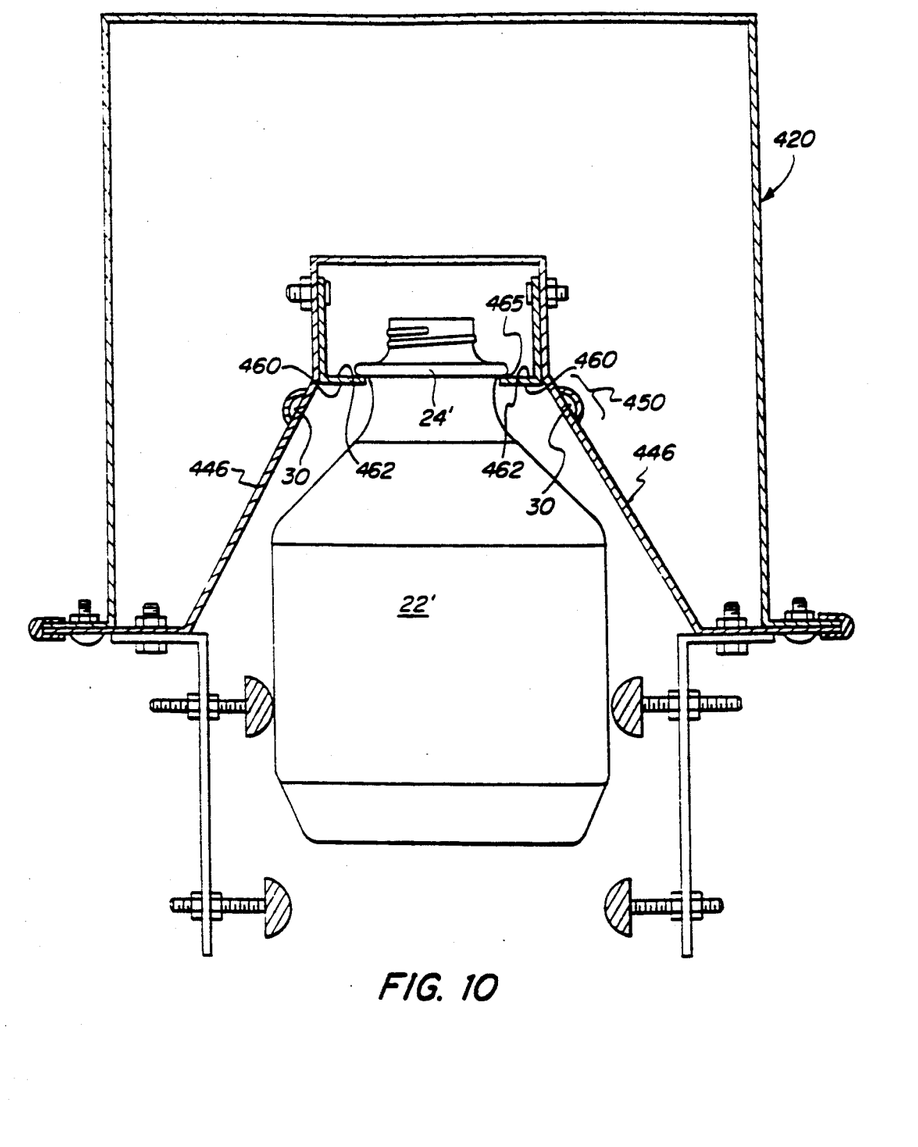
FIGS. 10 through 12 are end cross-sectional views of additional embodiments of an air conveyor in accordance with this invention depicting various neck guide, channel wall, and aperture arrangements.
Figure 11:
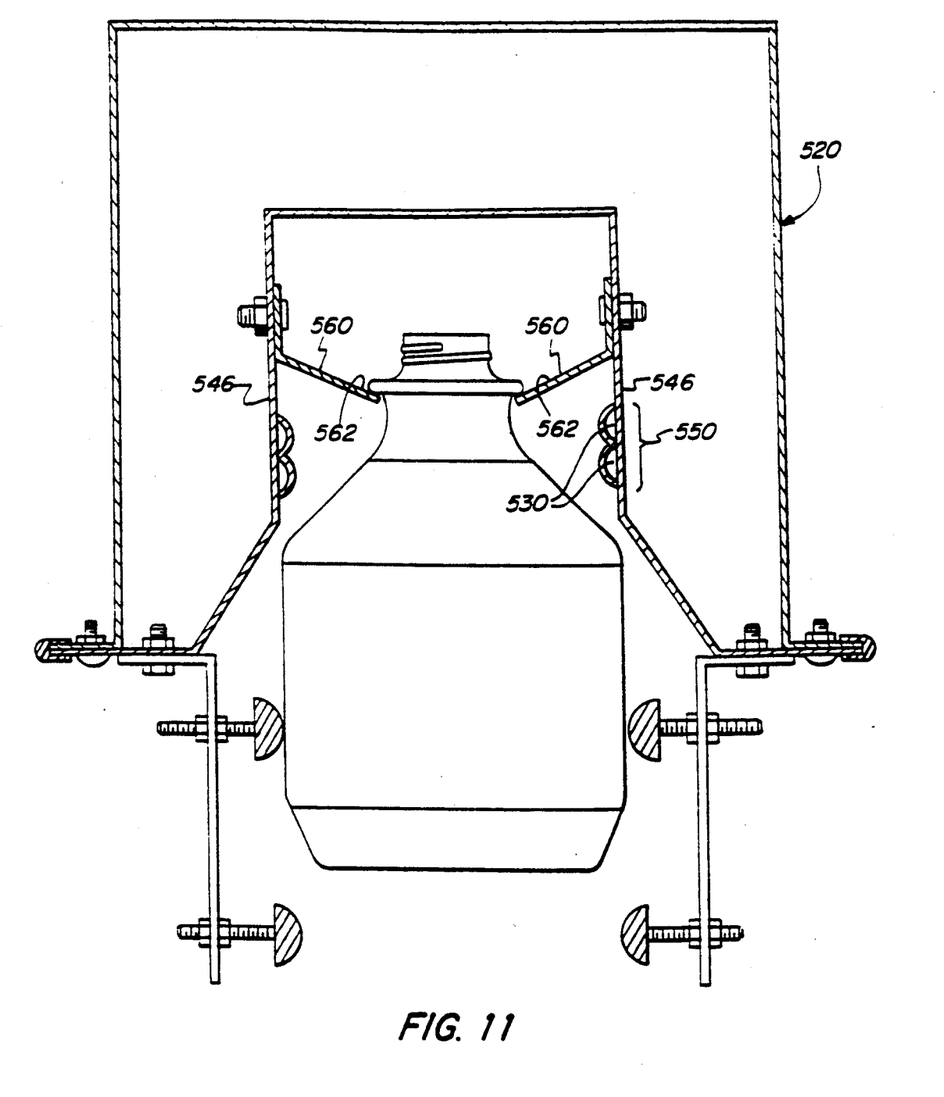
Figure 12:
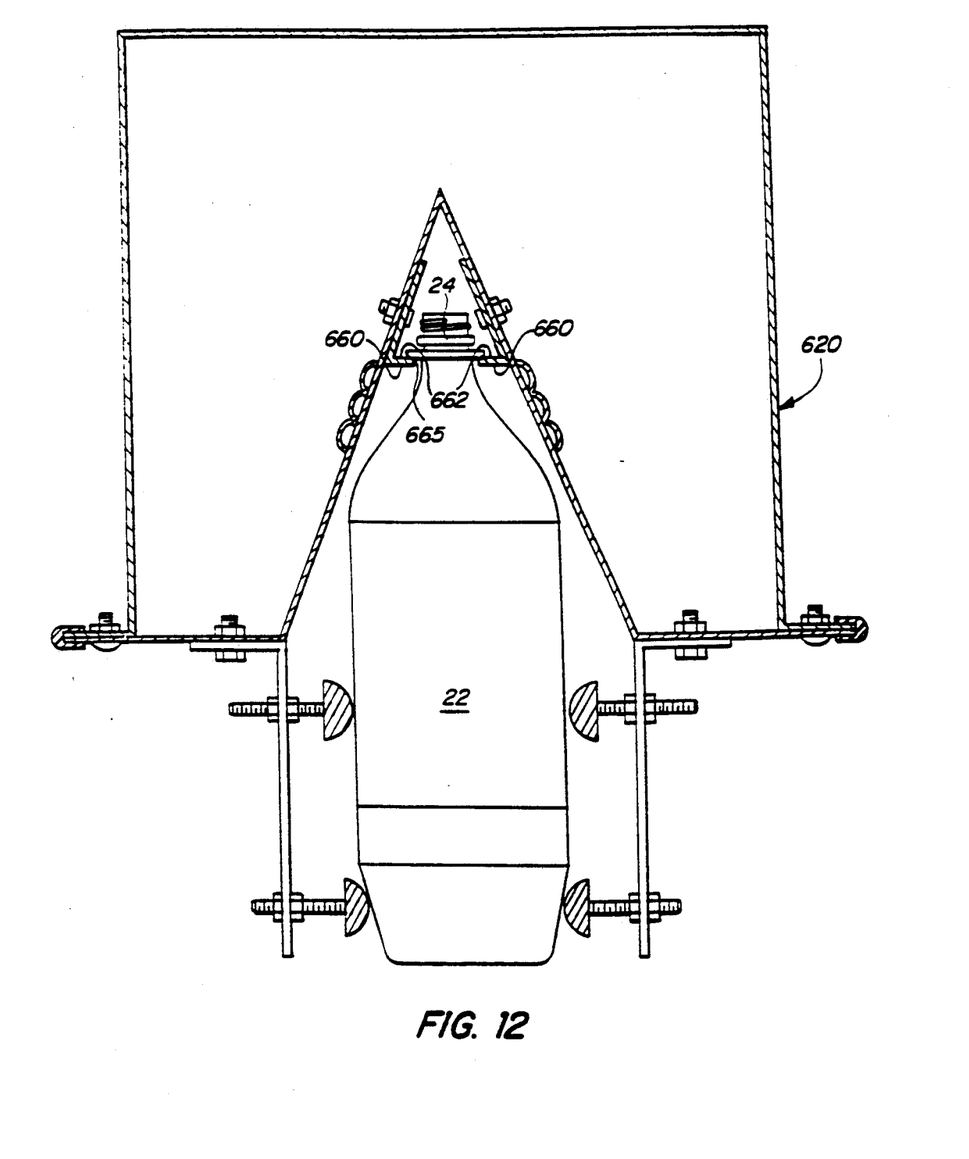

Referring now to FIGS. 10 through 12, other embodiments 420, 520, 620 of air conveyor 20 in accordance with the invention are illustrated. Conveyors 420, 620 include support arms 460, 660 which receive neck rings 24', 24 substantially in a surface contact 465, 665 to support bottles 22', 22. Conveyor 420 includes a plurality of rows 450 of one aperture 30, while conveyor 520 includes a plurality of rows 550 of two apertures 530.

Conveyors 420, 520 include opposing walls 446, 546 which converge in a direction toward support arms 460, 560. In conveyor 420, walls 446 converge substantially up to support arms 460 and apertures 30 are disposed in these converging sections. In conveyor 520, however, walls 546 converge only for a relatively short distance toward support arms 560, and apertures 530 are in substantially non-converging sections of walls 546.

Although the invention has been described with reference to particular arrangements of parts, particular features, and the like, these are not intended to exhaust all possible parts arrangements or features, and indeed many other modifications and variations will be ascertainable to those of skill in the art.

What is claimed is:

1. In an air conveyor for bottles having neck rings wherein said bottles are slidingly supported by said neck rings upon neck guides and wherein a plurality of apertures in a wall of a plenum chamber direct air from said plenum chamber toward said bottles to move said bottles along said neck guides, the improvement comprising said plurality of apertures disposed in said plenum chamber wall so as to direct air at said bottles substantially only beneath said neck rings; said neck guides angled downwardly such that said neck rings of said bottles rest on said neck guides substantially in a point contact; a pair of bottle guides movable between a first position for guiding bottles of a first size and shape along the air conveyor, and a second position; and means for moving said pair of bottle guides between said first and second positions.

2. The air conveyor according to claim 1 wherein said moving means comprises means for moving said bottle guide along an arcuate path between said first and second positions.

3. The air conveyor according to claim 1 wherein, in said second position, said bottle guides guide bottles of a second size and shape.

4. The air conveyor according to claim 3 wherein each of said bottle guides comprise first and second surface portions, and wherein said first surface portion guides bottles in said first position of said bottle guide and said second surface portion guides bottles in said second position of said bottle guides.

5. The air conveyor according to claim 1 wherein said moving means comprises means for moving said bottle guide along a substantially linear path toward and away from a bottle axis between said first and second positions.

6. The air conveyor according to claim 1 including a second pair of bottle guides for guiding bottles along the air conveyor.

7. An air conveyor for bottles having neck rings comprising:

a plenum chamber having a base portion;

walls extending from said base portion to form a conveying channel;

neck guides mounted to said walls, said neck guides having support surfaces extending inwardly toward each other from said walls, said surfaces for receiving said neck rings to support said bottles;

a plurality of apertures in said walls beneath said neck guides for directing air from said plenum chamber toward a shoulder portion of said bottles to move said bottles through said conveying channel;

said walls substantially converging from said base portion of said plenum chamber toward said neck guides, and said surfaces of said neck guides substantially perpendicularly extending from said converging walls; and a first pair of bottle guides movable between a first position for guiding bottles of a first size and shape along the air conveyor, and a second position.

8. The air conveyor according to claim 7 wherein said walls substantially converge from said base portion of said plenum chamber toward said neck guides, and wherein said surfaces of said neck guides substantially perpendicularly extend from said converging walls.

9. The air conveyor according to claim 7 comprising brackets for mounting said first pair of bottle guides to said base portion of said plenum chamber.

10. The air conveyor according to claim 9 comprising arm members and wherein said first arm members to said are pivotably connected by said arm members to said brackets for adjustment along an arcuate path between said first and second positions by said moving means.

11. The air conveyor according to claim 7 wherein said first pair of bottle guides are connected to said brackets for adjustment along a substantially linear path toward and away from a bottle axis between said first and second positions.

12. The air conveyor according to claim 11 including a second pair of bottle guides mounted to said brackets for guiding bottles along the air conveyor.

13. The air conveyor according to claim 12 wherein said first pair of bottle guides has a different length than said second pair of bottle guides due to the different turn radius for the pairs of guides through curves in the air conveyor.

14. In an air conveyor for bottles having neck rings wherein said bottles are slidingly supported by said neck rings upon neck guides and wherein a plurality of apertures in a wall of a plenum chamber direct air from said plenum chamber toward said bottles to move said bottles along said neck guides, the improvement comprising said plurality of apertures arranged in said plenum chamber wall substantially only below said neck guides; said neck guides angled downwardly to reduce the area of contact with said neck rings resting thereon; and a first pair of bottle guides movable along an arc between a first position for guiding bottles along the air conveyor and a second position.

15. The air conveyor according to claim 14 including a second pair of bottle guides substantially linearly movable toward and away from a bottle axis between a first position on said arc and a second position.

16. The air conveyor according to claim 15 including a third pair of bottle guides mounted at a position on said arc.

17. The air conveyor according to claim 15 wherein said first position of said first pair of bottle guides substantially matches said first position of said second pair of bottle guides.

18. The air conveyor according to claim 17 wherein said second pair of bottle guides in said first position replaces said first pair of bottle guides in said first position along curving portions of the air conveyor.

19. The air conveyor according to claim 16 wherein said second position of said first pair of bottle guides substantially matches said position of said third pair of bottle guides.

20. The air conveyor according to claim 19 wherein said third pair of bottle guides replaces said first pair of bottle guides in said second position along curving portions of the air conveyor.

* * * * *